United States Patent
Joshi et al.

(10) Patent No.: US 6,783,357 B2
(45) Date of Patent: Aug. 31, 2004

(54) PREHEATED FUEL AND OXIDANT COMBUSTION BURNER

(75) Inventors: Mahendra L. Joshi, Darien, IL (US); Arnaud Fossen, Verny (FR); Harley A. Borders, Lombard, IL (US); Remi P. Tsiava, Grigny (FR); Olivier Charon, Chicago, IL (US)

(73) Assignees: L'Air Liquide, Paris (FR); American Air Liquide, Inc., Fremont, CA (US)

( * ) Notice: Subject to any disclaimer, the term of this patent is extended or adjusted under 35 U.S.C. 154(b) by 0 days.

(21) Appl. No.: 10/336,121

(22) Filed: Jan. 3, 2003

(65) Prior Publication Data

US 2003/0157450 A1 Aug. 21, 2003

Related U.S. Application Data

(63) Continuation of application No. 09/637,295, filed on Aug. 11, 2000, now abandoned, which is a continuation of application No. 09/338,844, filed on Jun. 23, 1999, now Pat. No. 6,126,438.

(51) Int. Cl.⁷ .............................................. F23D 11/44
(52) U.S. Cl. ................... 431/161; 431/164; 431/189; 431/187; 431/10; 239/588; 239/397.5
(58) Field of Search ............................ 431/161, 8, 10, 431/11, 166, 167, 181, 187, 190, 351, 354, 175, 154, 159, 189, 9; 239/588, 132.3, 397.5, 419.5, 418; 110/336, 338; 60/736; 432/196

(56) References Cited

U.S. PATENT DOCUMENTS 2,148,202 A * 2/1939 Jalonack .................. 239/416.5
5,302,112 A * 4/1994 Nabors et al. .............. 431/159
5,554,022 A * 9/1996 Nabors et al. ................ 431/10
5,601,425 A * 2/1997 Kobayashi et al. ......... 431/190
5,975,886 A * 11/1999 Philippe ..................... 431/165
5,984,667 A * 11/1999 Philippe et al. ............. 431/175

FOREIGN PATENT DOCUMENTS

JP           63-83514 A  *  4/1988  ........... F23D/11/44

* cited by examiner

*Primary Examiner*—Josiah Cocks
(74) *Attorney, Agent, or Firm*—Christopher J. Cronin; Elwood L. Haynes

(57) ABSTRACT

A burner apparatus comprises a conduit adapted to convey preheated oxidant and having outlet and inlet ends, and a conduit adapted to convey preheated fuel and having outlet and inlet ends. The conduit adapted to convey preheated fuel is substantially parallel to the conduit adapted to convey preheated oxidant. The conduit adapted to convey preheated oxidant is positioned substantially vertically above the conduit adapted to convey preheated fuel. The conduit adapted to convey preheated oxidant and the conduit adapted to convey preheated fuel each are positioned within its own respective elongate cavity in a refractory burner block. Each of the conduits are positioned in their respective cavity such that a substantially annular region is present between an outer surface of each conduit and its respective cavity. Each conduit inlet end extends through a respective plenum for receiving an ambient temperature fluid, the plenums adapted to pass the ambient temperature fluid into the respective annular regions.

25 Claims, 5 Drawing Sheets

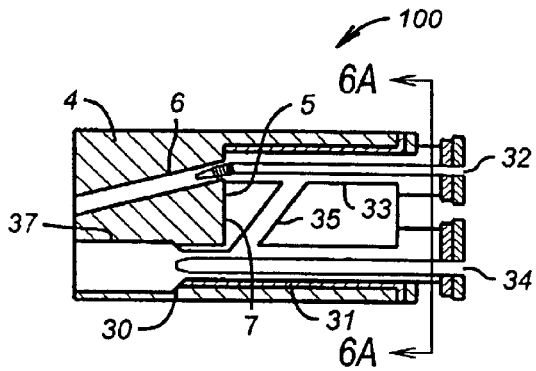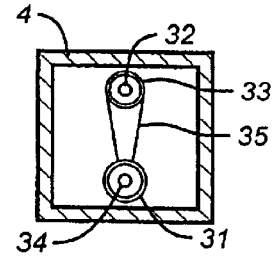
FIG. 6   FIG. 6A
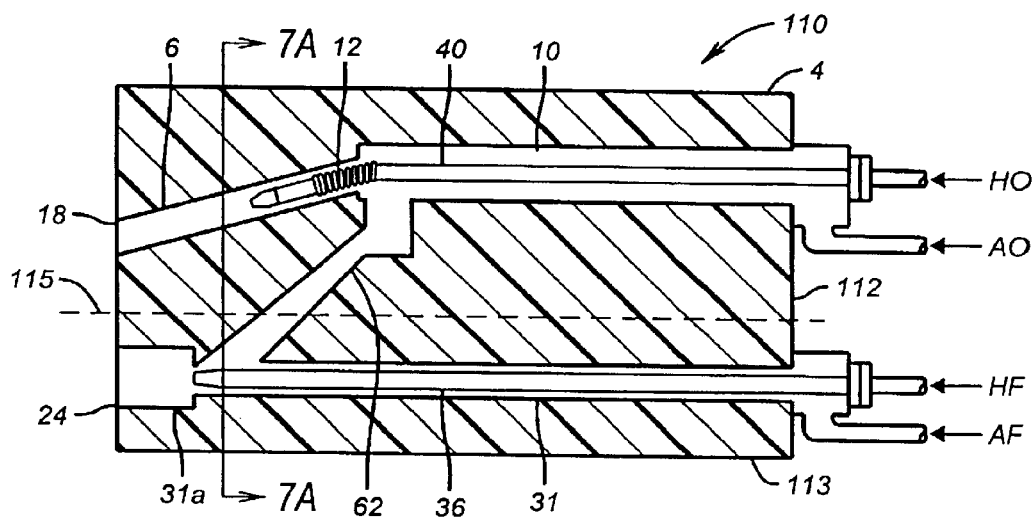
FIG. 7
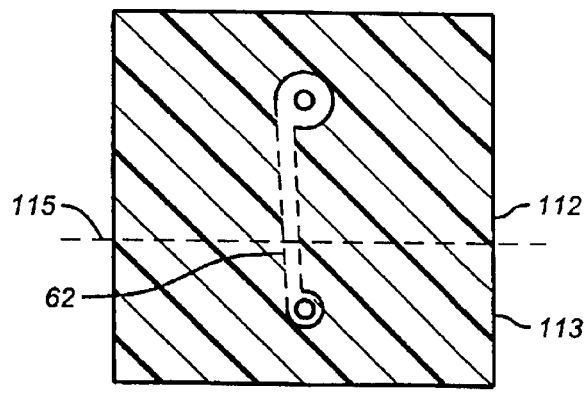
FIG. 7A

PREHEATED FUEL AND OXIDANT COMBUSTION BURNER

This application is a continuation of U.S. application Ser. No. 09/637,295, filed Aug. 11, 2000 now abandoned, the entire contents of which are incorporated herein by reference which is a continuation of Ser. No. 09/338,844 filed Jun. 23, 1999, now U.S. Pat. No. 6,126,438.

BACKGROUND OF THE INVENTION

1. Field of the Invention

The invention relates to apparatus for combusting preheated fuel and/or preheated oxidant.

2. Related Art

There are three basic types of combustion systems based on temperature of the fuel and oxidant: First and most common burner system utilize unheated (or ambient) fuel and oxidant for combustion. Both air-fuel and oxy-fuel burners of above types are widely used in industry (see U.S. Pat. Nos. 5,199,866; 4,690,635).

The second type of burner system employs preheating the ambient fluids (fuel and oxidant) inside the burner embodiment. This method employs ambient or slightly preheated fuel and oxidant as an input to the burner. It is commonly used with air-fuel burners and combustion engines. U.S. Pat. No. 4,257,762 describes one such method where preheated forced draft air is used for preheating fuel gas by partial mixing in the burner passage. In another application (U.S. Pat. No. 5,413,477), hot flue gas is entrained inside the burner to preheat fuel and combustion air using fuel-rich and fuel-lean staged combustion. On oxy-fuel combustion systems, the concept has been adapted and the preheating of natural gas is used by mixing with another hot fluid, or partial combustion in an oxygen poor atmosphere that leads to soot formation as well as preheating (U.S. Pat. No. 5,725,366). These are known technologies where preheating of either oxidant or fuel is carried out within the burner body or burner block. In summary, the burner or burner block is used as a heater for fuel, oxidant or both. In the first stage, partial combustion of fuel with oxidant is carried out and in the second stage, subsequent mixing of hot combustion products from first stage with the remaining fuel and oxidant is carried out. Thus, overall preheating of fuel and oxidant is achieved.

Preheated air for air-fuel burner systems is known. However, most applications involve preheated combustion air (U.S. Pat. No. 4,492,568; U.S. Pat. No. 5,823,769). The traditional methods employ a refractory heat exchanger (two regenerators) to preheat combustion air in a cyclic manner. Thus, with air-fuel burners and ceramic regenerators, preheating temperatures as high as 1100° C. for air containing 21 (volumetric) percent oxygen is quite common. The air is preheated in such devices by periodic (or cyclic) flow through a given regenerator (such as checkers containing ceramic elements) that have been preheated by the hot flue gases during the previous cycle. The disadvantage of above heat recovery system is that it can not utilize pure oxygen. The first reason is safety related. The flue gas-leaving the furnace is usually dirty due to entrained process particulates, fuel, condensate and vapors, which can deposit on the heated checker surfaces in one cycle and then react readily with preheated oxygen in the next cycle. This may create explosive conditions. The second reason is due to slippage of preheated oxygen (precious commodity) through refractory cracks and joints of the regenerator structure.

The use of metallic recuperators is also widespread but the preheat temperatures are lower than 700° C. due to the metallic construction and corrosion effects of hot oxidant (air) and flue gases on the metallic parts of the recuperator. Yet these kinds of air-fuel heat recovery systems have lower thermal efficiency due to the nitrogen contained in the air. This inert nitrogen has to be heated to process temperature and this heat is simply wasted. In addition, nitrogen at high temperature triggers the forming of NOx.

The preheated oxygen for combustion has been used before in the case of a reforming reactor (U.S. Pat. No. 5,588,974) where oxygen and steam are used to transform hydrocarbons into hydrogen and carbon monoxide. The hot oxidizing mixture is fed into the reactor at temperatures ranging from 500° F. to 1200° F. The object was to reform fuel into $H_2$ and CO by partial combustion. The combustion was not carried out in stoichiometric proportions to release heat for heating applications such as steel melting, glass melting, heat treatment, etc. The objective of the present invention is different since it deals with a combustion burner, where fuel is combusted with oxygen in nearly stoichiometric proportions.

SUMMARY OF THE INVENTION

In accordance with the present invention, burners are described which overcome many of the shortfalls of the previously known burners. Burners of the present invention are directed to apparatus for producing and oxidant-fuel flame with previously preheated oxidant and/or previously preheated fuel (preferably natural gas) for high temperature heating applications.

Thus a first aspect of the invention is a burner apparatus comprising:

a) a conduit adapted to convey preheated oxidant and having outlet and inlet ends;

b) a conduit adapted to convey preheated fuel and having outlet and inlet ends, the conduit adapted to convey preheated fuel being substantially parallel to the conduit adapted to convey preheated oxidant, the conduit adapted to convey preheated oxidant being positioned substantially vertically above the conduit adapted to convey preheated fuel;

c) the conduit adapted to convey preheated oxidant and the conduit adapted to convey preheated fuel each positioned within its own respective elongate cavity in a refractory burner block, each of the conduits positioned in their respective cavity such that a substantially annular region is present between an outer surface of each the conduit and its respective cavity; and d) each conduit inlet and extending through a respective plenum for receiving an ambient temperature fluid, the plenums adapted to pass the ambient temperature fluid into and through the respective annular regions.

Preferred are burners in accordance with the first aspect of the invention wherein the outlet end of each cavity is co-terminous with a hot face of the refractory burner block. Also preferred are burners in accordance with the first aspect of the invention wherein a plurality of conduits adapted to convey preheated oxidant are positioned in respective cavities in the refractory burner block, and plurality of conduits adapted to convey preheated fuel are positioned in respective cavities in the refractory burner block.

Further preferred are burners in accordance with this first aspect of the invention wherein the outlet end of the conduit adapted to convey preheated oxidant is connected to an inlet of a preheated oxidant nozzle assembly, the preheated oxidant nozzle assembly comprising an expansion joint which connects an inlet of the preheated oxidant nozzle assembly to a preheated oxidant nozzle downstream of the expansion joint, the preheated oxidant nozzle having a preheated oxidant nozzle outlet and an axis. More preferably, burners in accordance with this aspect of the invention are those wherein the preheated oxidant nozzle outlet is recessed from the outlet end of the cavity in which is positioned the conduit adapted to convey preheated oxidant.

Preferred burners in accordance with this aspect of the invention are those wherein the outlet end of the conduit adapted to convey preheated fuel is connected to an inlet of a preheated fuel nozzle, the preheated fuel nozzle having a preheated fuel nozzle outlet and an axis; those burners wherein the preheated oxidant nozzle axis is angled toward the fuel nozzle axis; and burners wherein the preheated fuel nozzle outlet is recessed from the outlet end of the cavity in which is positioned the conduit adapted to convey preheated fuel.

Further preferred burners in accordance with this aspect of the invention are those wherein the cavity in which is positioned the conduit adapted to convey preheated fuel comprises an expansion section, the expansion section connecting a first ambient fuel cavity positioned upstream of the expansion section with a second ambient fuel cavity positioned downstream of the expansion section and having an internal diameter greater than an internal diameter of the first ambient fuel cavity, the expansion section having an inlet and an outlet, the inlet of the expansion section having a diameter less than the outlet of the expansion section. Preferred expansion sections are frustoconical in shape.

Preferred burners are those wherein the preheated fuel nozzle outlet is positioned coterminous with the inlet to the expansion section.

Also preferred are those burners in accordance with the first aspect of the invention wherein the conduit adapted to convey preheated fuel extends through and is positioned within an intermediate conduit, the intermediate conduit positioned between the conduit adapted to convey preheated fuel and its respective cavity. The intermediate conduit has an outlet and an inlet end, the intermediate conduit inlet and connected to one of the plenums adapted to receive ambient fuel. The intermediate conduit and the cavity define an annular region between the intermediate conduit and the cavity, allowing for introduction of ambient oxidant in that annular region, the intermediate conduit and the conduit adapted to convey preheated fuel creating an inner annular region for conveying ambient fuel.

Other preferred burners in accordance with the first aspect of the invention are those further including a fluid connection which connects the cavity in which the conduit adapted to convey preheated oxidant is positioned with the cavity in which the conduit adapted to convey preheated fuel is positioned. This fluid connection allows ambient oxidant to mix with ambient fuel, and provides certain safety features, as more fully detailed herein. Yet another preferred variation of the burner in accordance with the first aspect of the invention is wherein the fluid connection has a fluid connection inlet and a fluid connection outlet, the fluid connection inlet connected with the cavity in which the conduit adapted to convey preheated oxidant is positioned at a position upstream of a point where the fluid connection outlet is connected to the cavity in which is positioned the conduit adapted to convey preheated fuel. Preferred burner constructions for this aspect include those wherein the refractory burner block is comprised of an upper refractory burner block and a lower refractory burner block, the upper and lower refractory burner blocks contacted in a plane which is generally parallel with an axis of the conduit adapted to convey preheated fuel, the lower refractory burner block having positioned therein the cavity in which is positioned the conduit adapted to convey preheated fuel, and the upper refractory burner block having positioned therein the cavity in which is positioned the conduit adapted to convey preheated oxidant.

A second aspect of the invention is a burner apparatus comprising:

a) a refractory burner block having a hot face and a cold face, the refractory burner block having an inner surface defining a hollow volume extending from the cold face to a position intermediate to the cold face and the hot face within the refractory burner block, the intermediate position defined by a wall portion of the inner surface of a substantially solid portion of the burner block, the substantially solid portion having a cavity adapted to convey ambient oxidant extending from the wall to the hot face and adapted to have positioned therein a conduit adapted to convey preheated oxidant from the cold face to the hot face, the burner further having a cavity extending from the cold face to the hot face and adapted to receive the conduit adapted to convey preheated fuel from the cold face to the hot face;

b) the burner further comprising a metallic fluid flow assembly, the metallic fluid flow assembly comprising a first metallic conduit, the first metallic conduit adapted to convey ambient oxidant through a first annulus defined by an inner surface of the first metallic conduit and an outer surface of said conduit adapted to convey preheated oxidant, the fluid flow assembly further comprising a second metallic conduit, the second metallic conduit adapted to convey ambient fuel through a second annulus defined by an inner surface of the second metallic conduit and an outer surface of the conduit adapted to convey preheated fuel, the fluid flow assembly including a connecting metallic conduit which connects the first and second metallic conduits, the connecting metallic conduit adapted to convey ambient oxidant from the first annulus into the second annulus.

Preferred burners in accordance with this aspect of the invention are those wherein the conduits adapted to convey preheated oxidant and preheated fuel are both metallic and are both removable from the burner apparatus.

A third aspect of the invention is a burner apparatus comprising an upper refractory burner block and a lower refractory burner block, and further comprising:

a) a conduit adapted to convey preheated oxidant and having outlet and inlet ends;

b) a conduit adapted to convey preheated fuel and having outlet and inlet ends, the conduit adapted to convey preheated fuel being substantially parallel to the conduit adapted to convey preheated oxidant, the conduit adapted to convey preheated oxidant being positioned in the upper refractory burner block and substantially vertically above the conduit adapted to convey preheated fuel which is positioned in the lower refractory burner block;

c) the conduit adapted to convey preheated oxidant positioned within its own elongate cavity in the upper refractory burner block and the conduit adapted to convey preheated fuel positioned within its own respective elongate cavity in the lower refractory burner block, each of said conduits positioned in their respective cavity such that a substantially annular region is present between an outer surface of each said conduit and its respective cavity;

d) each conduit inlet end extending through a respective plenum for receiving an ambient temperature fluid, the plenums adapted to pass said ambient temperature fluid into the respective annular regions, e) with the provision that the conduit adapted to convey preheated fuel extends almost entirely the length of the refractory block to an expansion point which is machined into the refractory burner block lower section, and a passage adapted to flow at least a portion of said ambient oxidant there through is provided, the passage positioned to give a substantial tangential-axial momentum to the ambient oxidant to cause it to swirl in the ambient fuel cavity, causing delayed combustion of the ambient fuel and preheated fuel.

The invention will be further described with reference to the following brief description of the drawing figures, and the description of preferred embodiments. Neither the figures nor the detailed description are meant to be limiting or to scale, bur rather should be viewed as aids to the skilled artisan to make and use the inventive burners as claimed.

BRIEF DESCRIPTION OF THE DRAWINGS

FIG. 6 illustrates in side elevation view a refractory burner block useful in a fifth burner embodiment of the present invention;

FIG. 6A illustrates in front elevation view the refractory burner block of FIG. 6;

FIG. 7 illustrates a side elevation view of a refractory burner block of a sixth burner embodiment of the present invention; and FIG. 7A illustrates in front elevation view the refractory burner block illustrated in FIG. 7.

DESCRIPTION OF PREFERRED EMBODIMENTS

Figure 1:
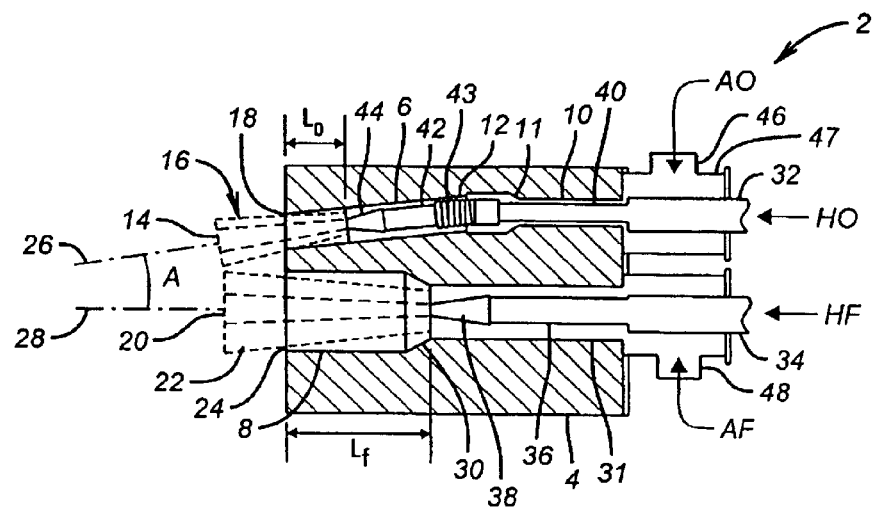
FIG. 1 illustrates in side elevation view one embodiment of a burner of the present invention.

In accordance with the present invention, combustion burners are presented which operate preferably with low oxidant supply pressure, such as the pressure delivered by a vacuum swing adsorption oxygen production unit. Low oxidant pressure means a pressure ranging from about 105,000 to about 170,000 Pa (absolute pressure) (50 m bar to 0.7 bar/relative pressure). However, this does not mean that oxidants supplied via membrane separation, adsorption, absorption, filtration, and the like, cannot be used. Vaporized oxidant may also be employed, as from liquid oxygen delivered via tank truck, or via pipeline. Methods of production, transportation, and delivery of oxidants, such as various purities of oxygen separated from air, are known in the industrial gas art, and are not part of the present invention. Therefore, these methods of production, transportation, and delivery are merely noted in passing.

According to the present invention, the fuel and the oxidant are introduced in the furnace through separate cavities in the burner assembly. The term "fuel," according to this invention, means, for example, methane, natural gas, liquefied natural gas, propane, atomized oil or the like (either in gaseous or liquid form) at either room temperature (about 25° C.) or in preheated form. The term "oxidant," according to the present invention, means a gas with an oxygen molar concentration greater than 21%, more preferably at least 50%. Such oxidants include oxygen-enriched air containing at least 50% vol. Oxygen, such as "industrially" pure oxygen (99.5%) produced by a cryogenic air separation plant, or impure oxygen produced by a vacuum swing adsorption process (about 88% vol. $O_2$ or more, or impure oxygen produced from air or any other source by filtration, adsorption, absorption, membrane separation, or the like. The term "ambient" as used herein means the temperature of the surrounding air typically ranging from about 0° C. to about 30° C., depending on the locale and time of the day, month, and year.

The cavities, as defined herein, are passages through a refractory block or through a furnace wall, and preferably have a generally cylindrical cross section. Any equivalent cross section can be used, such as square, rectangular, ellipsoid, oval, and the like.

Conduits are defined herein as tubular members having an outer shape, which may or may not correlate with its respective cavity, and which can be placed in its respective cavity to convey preheated fluids through the refractory burner block. Separate conduits are provided, each adapted to convey either preheated oxidant or preheated fuel. The conduits can be metallic tubes, metallic tubes or pipes with ceramic ends, ceramic tubes, or a combination thereof. Examples of suitable ceramic materials for injector tubes include alumina, zirconia, yttria, silicon carbide, and the like. Various stainless steels may be used for the conduits if the conduits are metallic, and metallic conduits having heat-protective refractory coatings, employing materials such as those mentioned for ceramic conduits, are also possible.

The conduits adapted to convey preheated fluids are installed in cavities opened through the furnace walls, or through a refractory or ceramic brick mounted in the furnace wall. In some embodiments, the length of the conduit is purposely made insufficient to span the respective length of its cavity in the burner block: the preheated fuel or oxidant flows from the conduit into its respective cavity, then from the cavity into the combustion chamber of the furnace. Thus, in some embodiments, the conduits adapted to convey preheated fluids stop before any change in direction of the preheated gas flow that can be imparted by the geometry of the cavity; in other embodiments, the conduits adapted to convey preheated fluids may be co-terminous with their respective cavity on a hot face of the refractory burner block (the face of the refractory burner block facing the combustion chamber).

The preheated fuel injection is preferably made by one or more, preferably identical conduits, the conduits in turn positioned within respective cavities for conveying ambient fuel, the cavities located in a lower half of the refractory burner block when viewed in side elevation. Each conduit has an axis, and when there are two or more conduits for conveying preheated fuel, they are preferably located in the same plane, which is preferably parallel to a surface of a load in the combustion chamber, such as a molten glass bath. Ambient fuel is supplied around the (or each) conduit adapted to convey preheated fuel. The ambient fuel can be the same or different composition than the preheated fuel. Indeed, the composition of each preheated fuel (in cases where there are more than one conduit adapted to convey preheated fuel) can be the same or different. For example, for a burner of the invention having two conduits adapted to convey preheated fuel, and their respective cavities for conveying ambient fuel, there could by four different fuel compositions.

The preheated oxidant injection is also preferably made by one or more, preferably identical conduits, the conduits in turn positioned within respective cavities for conveying ambient oxidant, the cavities located in an upper half of the refractory burner block when viewed in side elevation. Each conduit adapted to convey preheated oxidant has an initial axis orientation, and when there are two or more conduits for conveying preheated oxidant, the conduits are preferably located in the same plane. In one embodiment of the present invention, the conduits adapted to convey preheated oxidant (and their respective cavities) are essentially parallel with the conduits adapted to convey preheated fuel (and their respective cavities), with no change in direction. However, it is preferably that the conduits adapted to convey preheated oxidant, and their respective cavities, have an initial orientation parallel to the fuel conduits, and then angle toward the fuel conduits at an angel "A", as described in more detail herein. The transition between initial orientation and second, angled orientation, is preferably accomplished using a nozzle assembly. The nozzle assembly preferably includes an expansion element and a preheated oxidant nozzle. Ambient oxidant is supplied around the (or each) conduit adapted to convey preheated oxidant. The ambient oxidant can be the same or different composition than the preheated oxidant. Indeed, the composition of each preheated oxidant (in cases where there are more than one conduit adapted to convey preheated oxidant) can be the same or different. For example, for a burner of the invention having two conduits adapted to convey preheated oxidant, and their respective cavities for conveying ambient oxidant, there could be four different oxidant compositions.

The fuel and oxidant exit from the refractory burner block via outlets that are physically separated (except in certain embodiments described herein) and geometrically arranged in order to impart to the fuel fluid streams and the oxidant fluid streams angles and velocities that allow combustion of the fuel with the oxidant in the combustion chamber.

In preferred embodiments, the fuel cavities do not diverge, but rather are parallel as the fuel enters the combustion chamber. The same is true for the oxidant cavities.

The distance 1 between the extremities of the cavities when the fuel enters the combustion chamber of the furnace is comprised preferably between about 4 and 10 times the inner diameter $d_f$ of each fuel conduit. When the fuel conduit or cavity is not circular, the dimension "$d_f$" is an equivalent or average diameter corresponding to the cross-sectional area of an equivalent circular conduit or cavity.

The various mechanical details of some of the preferred embodiments are better understood with reference to the drawing FIG.s.

FIG. 1 illustrates many of the features of the first embodiment of the burner apparatus of the present invention. Illustrated at 2 is the burner apparatus, having a refractory burner block 4. Refractory burner block 4 comprises an upper cavity 6 which serves as the cavity through which ambient oxidant, designed as "AO", passes through on its way toward the furnace. Cavity 8 (illustrated in the lower portion of the refractory burner block) entails a passage through which ambient fuel (designated as "AF") passes as indicated by the arrow in FIG. 1. A first portion of cavity 6 is shown at 10 having a diameter, which is an initial diameter smaller than the rest of cavity 6. An expansion section at 11 is also indicated which transitions the smaller diameter section 10 into the main portion of cavity 6. The larger diameter section is designated 12 in FIG. 1. Preheated oxidant (indicated as "HO" in FIG. 1) is illustrated emanating on the left-hand side of the burner block at 14, while ambient oxidant emanates in the surrounding area as designated at 16. Both ambient oxidant and preheated oxidant emanate from burner block 4 through a hole 18 in the hot face of burner block 4. On the lower portion of FIG. 1, preheated fuel, designated "HF" is indicated emanating centrally through lower cavity 8 from burner block 4. Preheated fuel 20 is surrounded by ambient fuel, designated "AF" at 22. Both heated fuel and ambient fuel emanate from refractory burner block 4 at an exit hole 24 in the hot face of the burner block, which is also the terminal point of cavity 8.

Preheated oxidant emanates from burner block 4 having a central axis 26. Preheated fuel emanates from burner block 4 having a central axis 28. Central axis 26 of the preheated oxidant and central axis 28 of the preheated fuel make an angle "A" as indicated in FIG. 1. Angle A preferably ranges from 0° to about +20°.

Cavity 8 includes an expansion section 30, and a substantially cylindrical section 31. Preheated oxidant enters burner apparatus 2 through an inlet conduit indicated at 32, while preheated fuel enters burner apparatus 2, at an inlet conduit 34. Preheated oxidant and preheated fuel are typically and preferably provided by an upstream heat exchanger for each stream, neither of which is indicated in any of the drawing figures herein. While inlet conduits 32 and 34 are shown generally cylindrical and parallel, this is not necessarily required in the practice of the present invention.

A conduit 36 adapted to convey preheated fuel is indicated in FIG. 1 positioned generally centrally in cavity 31. Conduit 36 adapted to convey preheated fuel terminates with a nozzle 38, which is shown as a converging nozzle. Note that in this preferred embodiment, the terminal point of nozzle 38, in the direction of flow, coincides with the beginning of the expansion chamber 30 of the ambient fuel cavity.

Preheated oxidant enters through conduit 32, and traverses through a conduit adapted to convey preheated oxidant, indicated at 40. Conduit 40 in turn connects to an expansion joint or bellows 43, and into a second portion 42 of the preheated oxidant conduit. Section 42 in turn terminates with a nozzle 44. The terminal point of nozzle 44 is recessed a distance $L_o$ from the hot face of burner block 4, while the tip of nozzle 38 is recessed a distance $L_f$ from the hot face of burner block 4.

Figure 2:
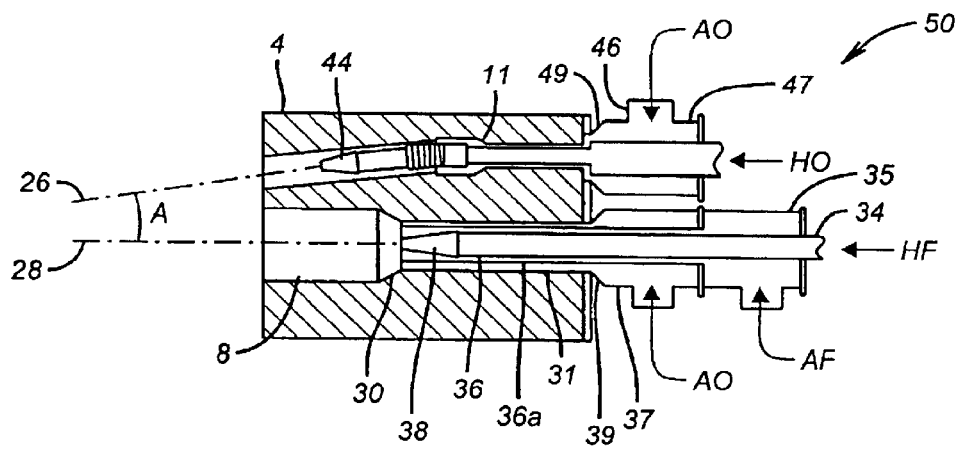
FIG. 2 illustrates in side elevation view a second burner embodiment in accordance with the invention.

FIG. 2 illustrates a second embodiment burner apparatus at 50. The refractory burner block 4 is for the most part the same as the refractory burner block 4 indicated at FIG. 1. Furthermore, in this apparatus, the conduit adapted to provide heated oxidant and its respective cavity are essentially the same as indicated in FIG. 1 and the details are eliminated in FIG. 2 for the purpose of clarity. Ambient oxidant enters into inlet conduit 46 and into a plenum 47, which connects, to a converging section 49. The main difference in the embodiment in FIG. 2 from that of FIG. 1 is the provision of ambient oxidant in a plenum 37 at a converging section 39 which leads into refractory burner block 4. In this embodiment, preheated fuel enters the apparatus at 34 and traverses through a central conduit that is the same as conduit 36 in FIG. 1, having the same nozzle 38. Preheated fuel enters the apparatus at 34 while ambient fuel enters the apparatus through a plenum 35. Plenum 35 connects to an intermediate conduit that is positioned intermediate cavity 31 and the conduit adapted to convey preheated fuel 36. This intermediate conduit is designated as 36a in FIG. 2. Other than these differences, the embodiment is the same as the embodiment in FIG. 1. The angle between the preheated oxidant axis 26 and the preheated fuel axis 28 is also designated as angle A in this embodiment, and may have the same range as in the first embodiment.

Figure 3:
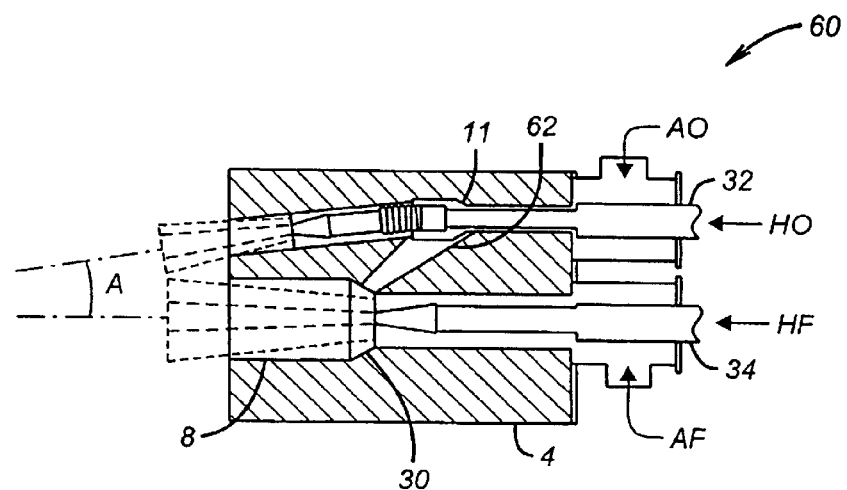
FIG. 3 illustrates in side elevation view a third burner embodiment in accordance with the invention.

FIG. 3 illustrates a third embodiment of the inventive burner apparatus. This embodiment is designated as 60 in FIG. 3, and includes the provision of a connecting passage 62 which connects the ambient oxidant cavity 11 with the ambient fuel cavity 8 near the position of the expansion section 30. All other respects the embodiment of FIG. 3 is the same as the embodiment to FIG. 1. The provision of connection 62 allows certain advantages, as will be further explained herein.

Figure 4A:
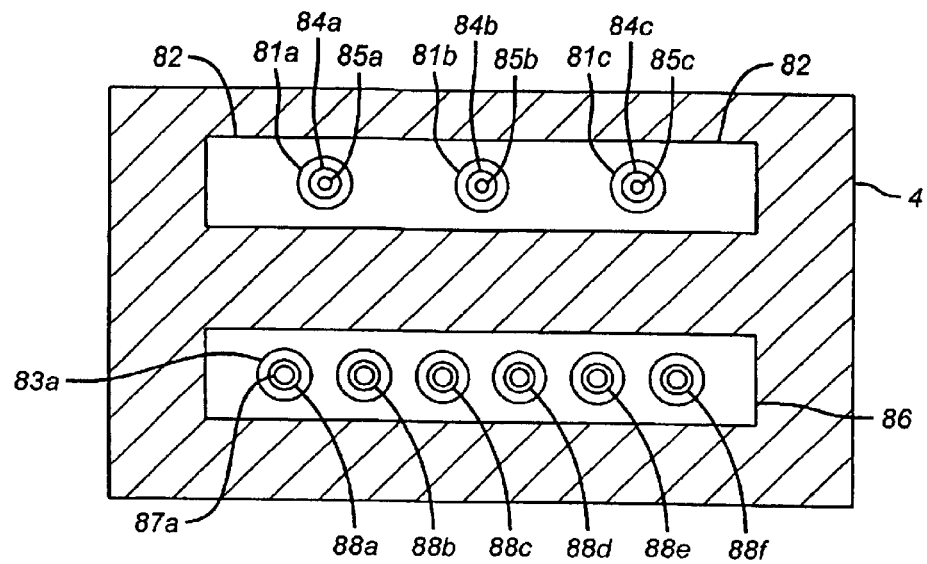
FIG. 4A illustrates in front elevation view the fourth burner embodiment of FIG. 4.
Figure 4:
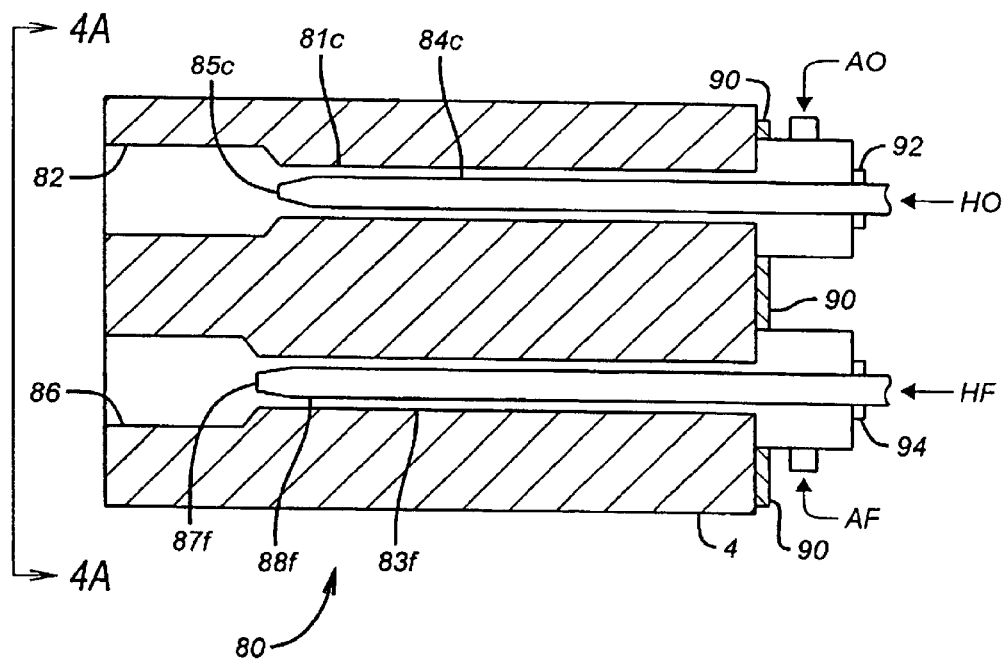
FIG. 4 illustrates in side elevation view a fourth burner embodiment in accordance with the invention.

FIGS. 4 and 4A illustrate another embodiment of a burner apparatus in accordance with the invention. Burner apparatus 80 includes a refractory burner block 4, having a plurality of ambient oxidant cavities indicated at 81a, b, and c, all feeding a slot 82, and an ambient fuel cavity indicated at 86. The ambient oxidant enters the refractory burner block 4 in a first diameter cavity 81 that is narrower in diameter than cavity 82. This allows some expansion of the ambient oxidant and the heated oxidant, the preheated oxidant traversing through a conduit designated as 84c in FIG. 4. As perhaps better indicated in FIG. 4A, in this apparatus, which is a particularly preferred apparatus, there are three preheated oxidant conduits 84a, 84b, and 84c, positioned within a rectangular, slot-shaped cavity 82 in the upper portion of the refractory burner block 4. Tips of the preheated oxidant conduits are indicated as 85a, b, and c. On the other hand, in this preferred apparatus there are six conduits adapted to convey preheated fuel indicated at 88a, b, c, d, e, and f, in the lower portion of refractory burner block 4 and positioned horizontally within cavity 86, with tips indicated at 87a and 87f. The tips of the respective conduits for preheated fluids are preferably tipped with converging nozzles, and preferably recessed into burner block 4 an equal distance from the refractory block hot face. Preferably the nozzle exits are positioned at or very near the beginning of respective expansions of their respective ambient fluid cavity. The distance of recession of the nozzle tips from the hot face is preferably from about ¼ to about ½ of the entire length of the refractory burner block 4 in this embodiment. Completing the burner apparatus of this embodiment are gasket material 90, preheated oxidant inlet conduit 92, and preheated fuel conduit 94.

Figure 5:
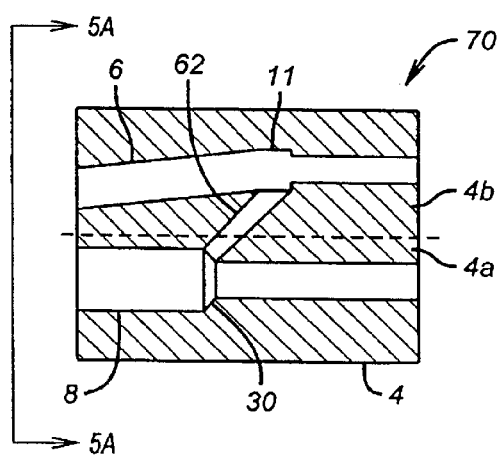
FIG. 5 illustrates in side elevation view a preferred refractory burner block useful in the fourth burner embodiment of FIG. 4 in accordance with the invention.
Figure 5A:
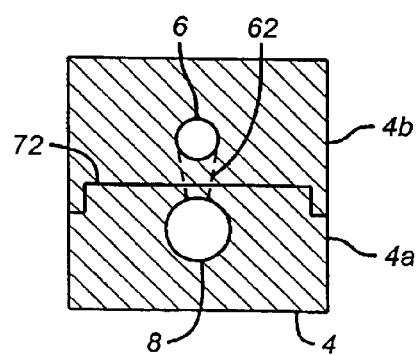
FIG. 5A illustrates in front elevation view the refractory burner block of FIG. 5.

FIG. 5 indicates another preferred embodiment of the burner apparatus in accordance with the present invention. In this embodiment 70, refractory burner block 4 comprises a lower half 4a and an upper half 4b as indicated in FIGS. 5 and 5A. This design allows for the connection 62 to be more easily provided for. As illustrated in FIG. 5A, lower half 4a and upper half 4b of refractory burner block 4 are fit together along a sliding channel 72 which provides a tight fit between the upper and lower blocks. Connection 62 is generally shown as having greater diameter near the connection with the cavity adapted to convey ambient oxidant 6, and having a smaller diameter near the connection to the cavity adapted to convey preheated fuel 8. While this is not necessary for operation of the burner of this embodiment, this configuration provides an ejector-type action as will be further explained herein. The preheated oxidant and preheated fuel conduits are not shown in the embodiment illustrated in FIGS. 5 and 5A for clarity purposes. A person skilled in the art should understand that these conduits are positioned similarly to the embodiment of FIG. 1.

FIG. 6 illustrates a further embodiment 100 of the burner apparatus of the present invention which employs a refractory burner block 4 having an upper cavity 6 formed in an upper portion of the refractory burner block. In this embodiment, the refractory burner block is essentially hollow on the cold end of the refractory burner block, the hollow region defined by an inner surface 5 including a wall that is substantially vertical, the wall indicated at 7. The wall is positioned approximately midway from the hot face and the cold face of the refractory burner block. In this embodiment of the burner apparatus of the invention, provision is made for a metallic burner assembly including components 31, 32, 33, 34, and 35. All of these components may be removed from the refractory burner block. Component 31 is merely a metallic cylinder-shaped element adapted to convey ambient fuel. Component 31 is essentially a metallic conduit serving the purpose of cavity 31 in the embodiment FIG. 1. Conduit 34, the conduit adapted to convey preheated fuel, is a metallic lance which may be removed from the metallic burner assembly. Conduit 31 is metallic and adapted to convey ambient fuel in a space defined between an inner surface of conduit 31 and an outer surface of conduit 34. Conduit 32 is a removable, metallic lance adapted to convey preheated oxidant. Conduit 33 is metallic and adapted to convey ambient oxidant in a space defined between an inner surface of conduit 33 and an outer surface of conduit 32. Finally, a connecting conduit 35 serves the purpose of connecting passage as previously discussed in reference to FIGS. 3, 5, and 5A.

The unique construction of the burner apparatus illustrated in FIGS. 6 and 6A, illustrates that in this particular embodiment of the burner apparatus of the invention, one may consider the apparatus to be comprised of two pieces, a refractory ceramic block 4 and a metallic assembly comprised of elements 31, 32, 33, 34, and 35, all of which may be one or several pieces. Preferably, conduits 31, 33, and 35 are one welded together and merely inserted into the cavities 6 and 37 of refractory burner block 4. Then lances 32 and 34 are preferably clamped or bolted to extensions of conduits 33 and 31, respectively, at the cold end of the burner. This configuration allows easy operator access and maintenance, and also allows for a myriad of shapes to be envisioned for the preheated fluid and ambient fluid injection connections.

FIG. 7 illustrates another embodiment of the burner apparatus in accordance with the invention, showing a burner apparatus 110 having a refractory burner block 4 comprised of an upper half 112 and a lower half 113 separated by the dotted line at 115. The injection of the preheated oxidant and ambient oxidant is achieved essentially the same as the embodiment indicated in FIG. 3, however the injection of preheated fuel and ambient fuel is somewhat different, with the provision of the conduit adapted to convey preheated fuel 36 extending almost entirely the length of the refractory block 4 to an expansion point 31a which is machined into the refractory burner block lower section 113. The special feature of the burner apparatus of FIGS. 7 and 7A are the provision of a swirl component to the ambient oxidant, or at least a portion thereof which traverses the connection passage 62. The ambient oxidant which traverses the passage 62 is given a tangential-axial momentum which causes the ambient oxidant to swirl in the cavity 31 and 31a, causing delayed combustion of the ambient and preheated fuel. The benefits of this tangential-axial combustion will be further explained herein. Again, the upper and lower blocks 112 and 113, respectively, are more easily fitted together than a monolithic block. Upper and lower blocks 112 and 113 may be fitted together using the sliding rail assembly indicated in FIG. 5A, which is eliminated for clarity in FIG. 7A.

Figure 8:
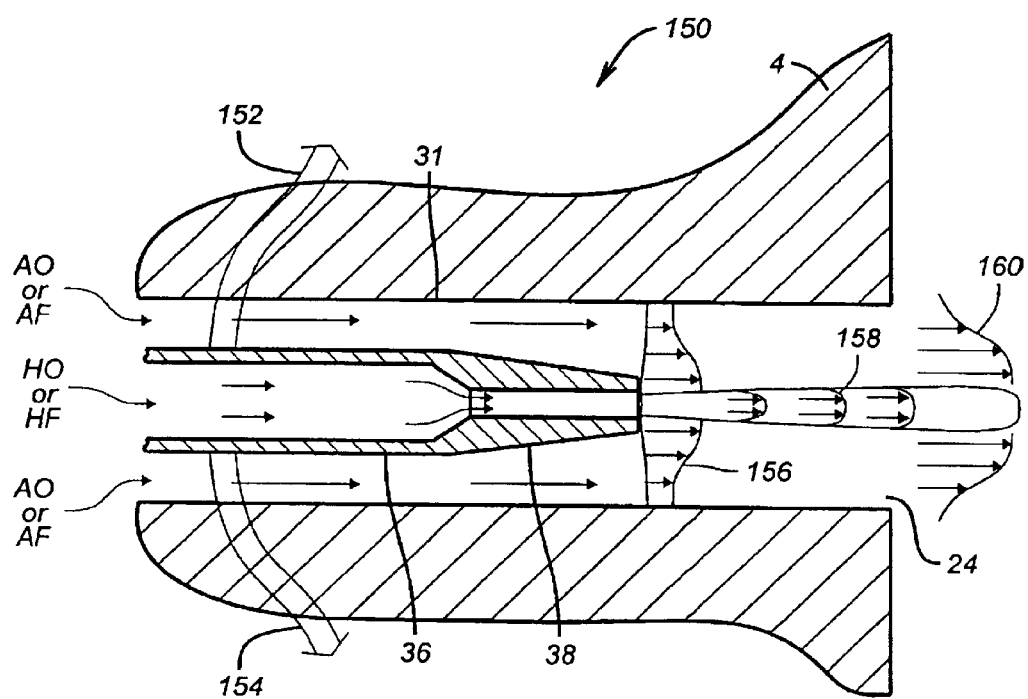
FIG. 8 illustrates advantages of the concentric nozzle design used in various embodiments.

FIG. 8 is an illustration in schematic format of some of the benefits of the burner designs of the present invention. Illustrated is a portion of a burner apparatus 150 including a portion of the refractory burner block 4, and showing a portion of the conduit 36 and its nozzle 38, as illustrated in FIG. 1 for heated fuel. As indicated in FIG. 8, heat flow is generally away from conduit 36 as indicated by the large arrows 152 and 154 which is advantageous from the standpoint that ambient fluid will be somewhat preheated in the burner apparatus and the heat will be used in the combustion process. Furthermore, as the preheated fluid leaves the nozzle indicated at 38, the flow patterns are as indicated by the arrows at 156, 158, and 160.

The velocity of the preheated fuel leaving the exit nozzle of the conduit adapted to convey preheated fuel ranges from about 5 meters/second (m/s) to about 120 m/s, more preferably from about 18 m/s to about 45 m/s. The ambient fuel leaving the burner preferably has a velocity ranging from about 10 to about 220 m/s, more preferably ranging from about 15 to about 110 m/s.

The velocity of the preheated oxidant leaving the exit nozzle of the conduit adapted to convey preheated oxidant ranges from about 5 meters/second (m/s) to about 60 m/s, more preferably from about 18 m/s to about 27 m/s. The ambient oxidant leaving the burner preferably has a velocity ranging from about 10 to about 90 m/s, more preferably ranging from about 15 to about 60 m/s.

The axial distance $L_o$ from the exit tip of the preheated oxidant nozzle to the hot face of the refractory burner block (where the ambient oxidant flows out of the refractory burner block and enters the combustion chamber of the furnace) preferably ranges from about 2 to about 6 times the inner diameter $d_o$ (or equivalent diameter, as defined previously for "$d_o$") of the exit tip of the preheated oxidant nozzle. Two adjacent oxidant cavities make a final diverging angle (in the direction of the flow) between about 0 and 15 degrees, preferably between about 0 and 7 degrees.

The axial distance $L_f$ from the exit tip of the preheated fuel nozzle to the hot face of the refractory burner block (where the ambient fuel flows out of the refractory burner block and enters the combustion chamber of the furnace) preferably ranges from about 1 to about 3 times the inner diameter $d_f$ (or equivalent diameter, as defined previously for "$d_f$") of the exit tip of the preheated fuel nozzle. Two adjacent fuel cavities make a final diverging angle (in the direction of the flow) between about 0 and 15 degrees, preferably between about 0 and 7 degrees.

The fuel cavity typically and preferably is matched with a corresponding oxidant cavity in vertical spaced relation in the refractory burner block, as seen in the various FIG.s and the discussion herein. The distance $D_c$ between the central axis of the oxidant cavity and the central axis of its respective fuel cavity preferably ranges from about 1.0 inches to about 8 inches.

The fuel cavity will preferably have an internal diameter $D_f$ ranging from about 1.0 to about 6.0 inches, more preferably ranging from about 1.84 inches to about 1.16 inches, measured at the exit from the burner block. This diameter is, in some embodiments, maintained through the entire length of the fuel cavity. However, it is more preferred to maintain this diameter only a fraction of the length defined above as $L_f$, preferably from about 50 to 90% of that length. The fuel cavity preferably has a diverging section which transitions the diameter of the fuel cavity from a first diameter to a second, greater diameter, allowing the ambient fuel, and to a certain extent, the preheated fuel, to expand as they traverse through the burner block. In all embodiments the internal diameter of the fuel cavity is greater than the outer diameter of the conduit adapted to convey preheated fuel, or the outer most conduit. In some embodiments there is included a concentric conduit around the conduit adapted to convey preheated fuel. This concentric outer conduit allows ambient oxidant to travel through an annular space created between the concentric outer conduit and the conduit adapted to convey preheated fuel.

The oxidant cavity will preferably have an internal diameter $D_o$ ranging from about 1.0 to about 8 inches, more preferably ranging from about 3.26 inches to about 2.66 inches, measured at the exit from the burner block. The oxidant cavity will typically have a first internal diameter, and transition into a larger diameter to accommodate an ambient oxidant nozzle assembly, which preferably includes an expansion section allowing for expansion due to preheated oxidant. In all embodiments the internal diameter of the oxidant cavity is greater than the outer diameter of the conduit adapted to convey preheated oxidant.

The total quantities of fuel and oxidant used by the combustion system are such that the flow of oxygen contained in the oxidant ranges from about 0.95 to about 1.05 of the theoretical stoichiometric flow of oxygen necessary to obtain the complete combustion of the fuel flow. Another expression of this statement is that the combustion ratio preferably ranges from about 0.95 to about 1.05.

The angle "A" between the central axis of the conduit adapted to convey fuel and the central axis of the conduit adapted to convey preheated oxidant preferably ranges from about 0 to about 20 degrees, it being understood that this generally causes the fuel to converge toward the oxidant.

The preferred operating temperature ranges of input preheated oxidant and preheated fuel ranges from about 20° C. to about 700° C. and from about 20° C. to about 450° C., respectively. More preferable ranges are from about 300° C. to about 600° C. and from about 200° C. to about 400° C., respectively. The inventive metallic burner of some embodiments is designed such that it can accommodate both cold and hot fluids (fuel and oxidant) for combustion, making it easy to switch from a hot fluid service to a cold fluid service, or vice-versa.

The present invention discloses several embodiments of preheated fuel and/or oxidant combustion burners. The loss of energy due to inert gas such as nitrogen (contained in air) is overcome by preferably using pure oxygen as an oxidant and preferably natural gas as a fuel. The above fluids are preferably heated to predetermined temperatures prior to injection into the inventive burners. The preheating of fuel and/or oxidant is generally achieved by separate dedicated heat exchangers installed upstream of the inventive burners, such as those disclosed in applicant's copending patent application Ser. No. 09/220,559, filed Dec. 23, 1998, incorporated by reference herein.

To reduce the energy loss due to nitrogen and for reducing NOx emissions, the burners of the present invention utilize preheated oxygen and/or preheated fuel in the inventive combustion burners.

To avoid any problems with the preheated oxidant initiated metal corrosion, the preheated oxidant is preferably ducted in metallic conduits made out of alloys or ceramic coated alloys specially designed for resisting hot oxygen corrosion, such as disclosed in U.S. Pat. No. 5,588,974, incorporated by reference herein. Some preferred materials include those known under the trade designations Inconel 600, stainless steel 310, Incoloy 800, and PM 2000. Inconel 600 has a composition of (by weight) Ni>72%, Cr 14–17%, Fe 6–10%, C<0.15%, Si<0.5%, and Cu<0.5%.

Some Preferred Alloys Compositions (% by Weight)

|  | Ni | Cr | Fe | C | Mn | Si | Al | Ti | Others |
| --- | --- | --- | --- | --- | --- | --- | --- | --- | --- |
| Stainless Steel 310 | 18–21 | 22–25 | 50–52 | <0.01 | 1.5 | <0.1 | — | — | Mo 3 |
| Incoloy 800 | 30–35 | 19–23 | >39.5 | <0.1 | <1.5 | <1 | 0.15–0.6 | 0.15–0.6 |  |
| Inconel 600 | >72 | 14–17 | 6–10 | <0.15 | <1 | <0.5 | — | — |  |
| PM2000 |  | 20 | Bal. | — | — | — | 5.5 | 0.5 | $Y_2O_3$ 0.5 |

Further the alloys may have a ceramic protective surface layer or coating, the ceramic selected from the group consisting of chromia, alumina, and silica. These may be sprayed onto the alloy surface or naturally grown in a passivation process from precursors—chromium, aluminum and silicon—diffused into the alloy surface. Preferred are diffused aluminum and silicon. Diffusion coatings lead to surface enrichment of Si typically between about 0.2 and 7%, and to surface enrichment of Al typically between about 5% to about 40%.

In addition, the inventive burners are constructed to have multiple enclosures. The inner enclosures (conduits) are used for conveying preheated fuel and preheated oxygen, whereas the outer enclosures (cavities) are used for conveying ambient temperature fuel or oxidant. The use of outer enclosure having cooler fluid eliminates thermal stresses in the burner body and burner parts remain resilient at high temperature, unlike ceramics that are very fragile, and resist thermal cycling when switching from cold to hot fluid service.

The inventive burners are designed such that "delayed" combustion is achieved. In the first embodiment, concentric conduit(s) of preheated oxygen are separated from the natural gas conduit(s) in a specific geometry such that interaction of preheated oxidant and preheated fuel occurs in the furnace combustion zone.

In the second embodiment, a predetermined portion of ambient oxidant is admitted in an annular space around an ambient fuel lance and interior of the fuel burner block cavity. This oxidant amount can range from about 5 to about 20% of the total oxygen needed for combustion. The small amount of ambient oxidant allows clean and cool operation within the burner block and at the same time intermediate combustion products comprising soot particles are preferably produced by the preheated fuel combustion with the ambient oxidant. The intermediate combustion products comprising soot is then injected in the furnace for subsequent combustion with preheated and ambient oxidant mixture.

In the third embodiment, a portion of oxidant (mixture of preheated and ambient) is diverted using an ejector effect of the fuel and mixed with the preheated fuel within the burner block for promoting thermal cracking of fuel and production of intermediate combustion products comprising soot particles. This is done using a special transport passage. The intermediate combustion products comprising soot, which is raised to higher preheat temperature (due to partial combustion), is then injected in the furnace. Subsequent combustion takes place with the remaining preheated oxidant in the furnace combustion zone. This burner embodiment produces a very luminous and low emission flame. The flame also preferably has lower momentum (compared with the flame produced by the burner of the first and second embodiments) and it preferably provides more uniform heat distribution to the load.

In the fourth embodiment, multiple concentric injector conduits are used for both preheated fuel and preheated oxidant to enable higher firing capability. In this embodiment (FIG. 4) parallel or substantially parallel injector conduits for both preheated fuel and preheated oxidant, preferably form a wide, flat flame. The refractory burner block geometry can preferably be constructed from upper and lower halves. Rectangular slots in the hot face are designed for injection of ambient fuel and oxidant.

In a further embodiment, concentric injector conduits use steam as a cooling fluid instead of ambient fuel and ambient oxidant. The coolant (steam) can be injected in the furnace via transmission through the annular region between the conduits and their respective cavities. The advantage of steam is that it can be compressed in small volume and it is an effective medium for cooling.

The utilization of preheated fuel (preferably at about 400° C.) and preheated oxidant (preferably at about 600° C.) in the inventive combustion burners, compared to ambient fuel and oxidant firing in traditional burners, allows an additional fuel and oxidant savings to be realized. In addition, higher furnace productivity (throughput) and lower emissions can be obtained.

Some of the new aspects and various burner details can be summarized as following:

1. In some embodiments, metallic components having multiple enclosures to enable combustion of preheated fuel and preheated oxidant for obtaining higher thermal efficiency, productivity and lower emissions from a high temperature furnace.
2. A unique concentric burner conduit and nozzle geometry, configuration and construction where the preheated fuel and preheated oxidant injection, mixing and combustion are achieved for producing a very low momentum, high luminosity flame suitable for high temperature heating applications. The concentric preheated fuel and preheated oxygen conduits and nozzles allow operation with preheated fluids as well as using ambient fluids in the case of fuel or oxidant heat exchanger failure. The conduits, preferably tipped with nozzles, are used for conveying preheated fuel (or oxidant) whereas the outer cavities are used for conveying ambient fuel (or oxidant).

3. A unique burner body construction where the preheated oxidant or preheated fuel passages are submerged inside a non-preheated oxidant or non-preheated fuel passages to minimize thermal stresses on various burner parts. This construction is a multiple enclosure construction. Welding is preferably avoided with the preheated oxidant conduit having metallic parts. The parts are assembled using pipe threads, machine threads (for nozzles) and the supply conduit lances are simply flanged using high temperature ceramic fiber gaskets for sealing. These multiple enclosure constructions also help in containing any preheated oxidant or fuel leak from the inner (high temperature) enclosure within outer ambient (a relatively cooler) oxidant or fuel cavity enclosure, respectively. This leak prevention or containment feature makes this burner safe and convenient to operate.

4. In addition, the multiple enclosure construction reduces overall heat losses to the surrounding since colder fuel or colder oxidant is always flowing on the exterior surface of the conduits adapted to convey preheated gases. This cooler fuel or oxidant is then injected in the furnace so net heat loss is minimized.

5. Use of heat and corrosion resistant materials: these metals and ceramics have been carefully selected for minimum oxidation while continuous exposure to high temperature oxygen.

6. The burner "concentric" conduits for conveying preheated oxidant are preferably constructed with a metallic alloy that has proven oxidation resistant at high temperature and can withstand thermal cycling—in case of rapid switching from hot to cold fluid service.

7. New flame characteristics: low NOx, delayed mixing of preheated fuel with preheated oxidant, and thermal cracking of fuel. The multi-enclosure burner, bringing preheated fuel and preheated oxidant to burn together, has introduced a new high temperature combustion phenomena that is not commonly found in high temperature melting applications.

In one preferred embodiment, the inventive burner comprises a refractory burner block having an upper half block and a lower half block, so-called split construction. In this embodiment, the upper half block has an elongate cavity and conduit therein, the conduit adapted to convey preheated oxidant, the cavity adapted to convey ambient oxidant. The lower half block has, similar cavity and conduit, the conduit adapted to convey preheat fuel, the cavity adapted to convey ambient fuel. The two halves are preferably matched using standard fastening techniques (refractory sliding joints, metallic straps, refractory plugs, and the like, or any combination of same). This two piece construction provides a safe assembly with minimum risk of undesirable combustion within the interior of the block due to capillary type leakage of preheated oxidant and preheated fuel through various cracks in the refractory burner block.

8. Backup ambient fuel and ambient oxidant: this backup supply is always there for rapid switching from hot to cold service, in case of malfunction of the upstream heat recovery (or heat exchanger) system for oxidant and fuel preheating. The flow passages for the ambient fuel and ambient oxidant are carefully designed such that equivalent flame characteristics (flame length, width and momentum) are obtained in terms of preheated or ambient fluid operation. This is achieved by implementing appropriate flow velocity ranges for both ambient and preheated fluid operation.

9. A predetermined amount (from about 5 to about 40%) of total oxidant and ambient fuel is used to cool burner parts for reducing thermal stresses and also provide an enclosure for containment of any leaks due to preheated oxidant or preheated fuel enclosure failure.

10. The conduit adapted to convey preheated oxidant is inserted into its refractory burner block cavity in a predetermined angular configuration (0° to 20°) to the conduit adapted to convey preheated fuel. The conduit adapted to convey preheated oxidant is preferably threaded to the oxygen supply pipe and it is preferably equipped with a flexible joint (expansion bellow) to counter thermal expansion and also to ease insertion into an angular burner block cavity. The burner block cavity for the conduit adapted to convey preheated oxygen can be at an angle of (0° to 20°) with respect to conduit adapted to convey fuel axis.

11. Both preheated fuel and preheated oxidant are injected in two "concentric streams," the cooler fluid surrounds the hotter fluid: this is a safety aspect of the design; burner parts are cooled down on the exterior body to minimize thermal stresses and heat losses to the surrounding.

12. Cooler burner body: because of the cold fluid surrounding the hot one, an insulating layer is formed that keeps the refractory burner block body at lower temperatures; moreover, an insulating sheath covers the burner external parts, ensuring their handling is not dangerous to operators.

As previously explained, illustrated in FIG. 1, both preheated fuel and oxidant conduits and nozzles are concentric and the combustion burner has multiple enclosures. The preheated fluid (fuel and oxidant) conduits are submerged in ambient fluids. All preheated fluid metallic parts are either threaded or flanged. Welding is preferably avoided with the metallic parts. The ambient fluids (fuel and oxidant) are used for cooling refractory internal surfaces and also external surfaces of the conduits adapted to convey preheated fluids and their nozzles, as well as the burner manifold. In this way the whole burner remains at a temperature preferably no higher than 300 to 400° F. without external insulation. By using external insulation, the refractory block outer body temperature can be maintained around 150 to 200° F.

The various particularly preferred design velocities for fuel and oxidant at the concentric nozzle exit are given in Table I. The low and high range are given to suit various flame characteristics, such as short and bushy to long and lazy flame. The preheated fuel and oxidant velocities are achieved by using a standard straight internal diameter nozzle with slight taper on the exterior (see FIG. 1). The nozzles preferably have coarse machine threads so they can be removed or installed quite easily. The amount of ambient fuel and ambient oxidant (as a fraction of total fuel) are selected such that the inventive burner preferably operates in "cold conditions" (without preheated fluids) with the same nozzles. The cross sectional annular area between the exterior of the conduits adapted to convey preheated fluid and the burner block internal cavity diameter determines the ambient fluid flow velocities.

TABLE I

Ambient and Preheated Fuel and Oxidant Velocities and Proportions

| | Ambient Nat. Gas | Ambient Oxygen | Preheated Nat. Gas | Preheated Oxygen |
|---|---|---|---|---|
| Low Range (ft/sec) | 30 | 30 | 15 | 15 |
| High Range (ft/sec) | 750 | 300 | 400 | 200 |
| Volume (% of total) Preheated Operation | 0 to 50 | 0 to 50 | 50 to 100 | 50 to 100 |
| Volume (% of total) Cold Operation | 100 | 100 | 0 | 0 |

The preheated oxidant velocity preferably does not exceed 400 ft/sec at the exit of the nozzle to avoid faster oxidation of nozzle material. However, burners constructed to achieve preheated oxidant velocity of this high nature can be within the invention, as long as the velocity is temporary or cyclic in nature. The conduits adapted to convey preheated oxidant are preferably constructed of nickel-chromium-iron alloy and internal flow velocities are preferably kept below 100 ft/sec to reduce high temperature oxidation of the conduit material. The ambient oxidant velocities are limited to maximum of 150 ft/sec in the annular region between the conduit adapted to convey preheated oxidant and its cavity, and maximum velocity at the nozzle is about 750 ft/sec. The desired volumetric proportions of both ambient and preheated fluids for "standard" preheated operation and "backup" cold operation are also listed in Table I.

As illustrated in FIG. 1, the "concentric" preheated and ambient fuel nozzle(s) is preferably installed substantially horizontally, whereas the "concentric" preheated and ambient oxygen nozzle(s) is preferably installed at an angle $A=\pm 20°$ to the axis of the preheated fuel conduit. The preferred angle is about $10°$ downward to the horizontal axis. The axial spacing of concentric oxidant nozzle ($L_o$) and concentric fuel nozzle ($L_f$) from the burner block hot-face preferably ranges from about 2 inches to about 8 inches. This distance is based on overall burner block length and the furnace wall thickness.

FIG. 2 illustrates the second embodiment where from about 5 to about 20% of the oxygen required for stoichiometric combustion is admitted, at ambient temperature, in the annular passage around the conduit adapted to convey ambient fuel exterior and interior of the fuel burner block cavity. The ambient oxidant keeps the burner block interior clean, cool and at the same time it provides sufficient oxygen to crack at least a portion of the preheated and ambient fuel (into soot particles) due to partial combustion in the burner block cavity. The velocity ranges of various fluids remain same as in the first embodiment. The combustion of soot-rich preheated fuels in the furnace with preheated oxidant produce a very luminous and low NOx emission flame.

In the third embodiment, illustrated in FIG. 3, a minor portion of ambient oxidant is directed toward the preheated fuel nozzle exit via a special passage in the burner block. The minor portion of the ambient oxidant stream is effectively entrained by the ejector action of the ambient and preheated fuel jets. The low-pressure region around the preheated fuel jet in the burner cavity is sufficient to withdraw from about 5 to about 20% of total oxidant (mixture of preheated and ambient) in the special passage downward and it is directed towards preheated fuel jet. Here the fuel and oxidant mix and produce soot particles and higher hydrocarbons. The combustion of higher hydrocarbons in the furnace with preheated oxidant produces a very luminous and low emission flame.

FIG. 4 illustrates the fourth embodiment having individual rectangular slots for the ambient fluids (both fuel and oxidant) and having multiple conduits adapted to convey preheated fuel and oxygen. The rear of the burner has separate manifolds for ambient fuel and ambient oxidant supply. In this manifold, which is preferably rectangular in shape, several conduits adapted to convey preheated fuel are inserted and secured using standard flange connections in the rear of the burner. This embodiment is similar to the first embodiment except multiple conduits adapted to convey preheated fluids are positioned (side by side) in a rectangular manifolds, the manifolds adapted to convey ambient fluids.

The rectangular slots (width and height) are preferably sized to give the same ambient fluid velocity ranges as indicated in Table I. The multiple conduits adapted to convey preheated fluids are sized according to Table I specifications for velocities and volume proportions. It is preferred that all conduits produce the same flow rate and velocity, but this is not required. This approach will allow firing large capacities (as high as 30 MM Btu/hr) and oxidant preheat temperatures as high as 700° C. and fuel preheat temperatures as high as 400° C.

The fifth embodiment employs "dry steam" as a cooling media instead of ambient fuel and ambient oxygen. The steam keeps the burner external enclosures clean, cool, and at the same time it prevents any thermal stresses on the burner body. The steam is then injected in the furnace. This particular embodiment can be applied to all embodiments by replacing ambient fuel and ambient oxygen with steam.

Additional features of the invention include the use of fuel oils in the inventive burners. Liquid fuels such as diesel, #4, #6, bunker type can be used. The heavier fuel oils (such as bunker C) are generally preheated up to about 200° C. and are inserted into the preheated fuel port using an atomizer unit, such as that described in U.S. Pat. No. 5,984,667, incorporated herein by reference.

The use of the split burner block in some embodiments allows some of the ambient oxidant to be ejected into the fuel stream. This is generally not achievable using a monolithic burner block. One solution is the use of two individual blocks, one for oxidant and one for fuel, where the cold oxidant channel connecting them is properly machined, and that have complementary shapes to assemble with one another in a sealed manner. The example illustrated in FIGS. 5 and 5A illustrates the "sliding rails" design, which is easy to fit together and achieve good seal.

An additional technical solution for the inventive burner is to envision the burner as having two functional parts; first, the part which includes the hot face (which is exposed to the furnace radiation) which serves the role of a thermal insulation. Here the aim is to prevent the furnace heat losses and the overheating of the parts accessible to the operator. Therefore, the hot face preferably comprises refractory compounds molded and/or machined as illustrated in FIG. 1. Suitable materials for the refractory burner block include fused zirconia, fused cast AZS (Alumina-Zirconia-Silica), rebonded AZS, or fused cast alumina. The choice of a particular material is dictated by, among other things, the type of furnace or heating system the burner is used for. Second, the part of the burner that includes the cold face, the side that the furnace operator has access to install or remove the burner. In this part the primary function is mechanical. It has to support and accommodate the fuel and oxidant metallic conduits. The mechanical function is preferably fulfilled by employing a metallic body, which has the advantage of being able to be constructed into complex shapes that ceramic blocks cannot be constructed with.

Thus, the conduit adapted to convey ejected ambient oxidant from the ambient oxidant cavity to the ambient fuel cavity can be an integral component of this metallic body.

For increased thermal insulation, the space between the metallic conduits can be plugged with some fibrous insulation, such as glass fibers. A lining made thereof can be inserted between the back of the refractory ceramic part of the burner and the metallic flange connecting the metallic body part to the refractory part of the burner. The connection between the metallic parts and the refractory ceramic block part is preferably sealed by a tight contact between metal and ceramic inside the block, and a proper compression gasket at the rear of the refractory ceramic block. Entrainment caused by the fluids flowing into the furnace prevents any accumulation of oxidant or fuel inside the hollow burner block.

A carburization resistant sleeve is preferably used as part of the conduit adapted to convey preheated fuel, near the fuel nozzle. Since preheated fuel could cause too much carburization of a metallic sleeve, it is preferable to use materials selected from the group consisting of graphite, silicon carbide (SiC), alumina ($Al_2O_3$), and the like, or combination of those materials. The carburization resistant material preferably also has a fair oxidation resistance, because of the impingement of ambient oxidant through the conduit connecting the ambient oxidant conduit with the ambient fuel conduit.

A swirling motion may be introduced in the ambient oxidant flow. The use of a metallic interconnect passage between the ambient oxidant and ambient fuel cavities offers flexibility to use complex shapes for metallic channels between the oxidant and fuel cavities. In one preferred embodiment, the ambient oxidant is ejected around the preheated fuel stream in a tangential-axial direction as illustrated in FIG. 7A (in contrast to radial ejection illustrated in FIGS. 5 and 5A). This tangential-axial oxidant injection produces a swirling oxidant stream, which is beneficial to the flame in several ways. The swirling in the outer oxidant annulus is known to produce additional soot due to the higher residence time, and delay mixing between fuel and remaining oxidant and thus delay combustion; a slower combustion then leads to lower peak flame temperatures inside the flame structure and an increased flame length. In the meantime, the recirculation of exhaust gases into the flame could reduce the Nox emissions level and possibly induce higher flame luminosity.

Process Advantages Due to Concentric Nozzle Design

The concentric nozzle design for both preheated fuel and oxidant conduits and nozzles has distinct advantages as far as combustion process and heat transfer are concerned. This is illustrated in FIG. 8.

As illustrated in FIG. 8, the concentric jets having the preheated fluid (fuel or oxidant) in the center and ambient fluid on the outside prevent any diffusion of preheated fluid into refractory burner block. The refractory burner block internal surfaces generally have porous surfaces and small cracks due to thermal cycles. By having a concentric construction, the preheated fluid is well contained inside a metallic enclosure whereas the cooler fluid is contained inside the refractory enclosure (in the burner block). As illustrated, the ambient fluid cools the preheated fluid conduit and the burner block interior by forced convection.

FIG. 8 also illustrates that by combining both velocity profiles (of preheated fluid and ambient fluid), a much wider impact area is obtained in the furnace with concentric conduit design. This has positive implications as far as combustion is concerned. The wider overall jet allows more surface area for flame development and much wider heat release, resulting in lower peak flame temperatures and more uniform heat distribution.

Another advantage of concentric conduit design is active cooling of preheated fluid conduit material and resulting lower operating temperature of the material. This results in lower oxidation/corrosion rate and longer life of the combustion burner.

The preheated fuel and oxidant are injected through "concentric" burner nozzle(s) for creating oxy-fuel combustion inside the heating furnace atmosphere. The oxidant and fuel are preheated to high temperature (~400 to 1800° F.), preferably via a heat exchanger, are conveyed through a multi-enclosure-self-cooled burner body, self-cooled burner nozzles(s) and finally into a special refractory burner block. In one embodiment, both preheated oxidant and fuel prior to injection in the heating furnace react partially inside the refractory block cavity to promote thermal cracking of gaseous fuel to produce higher hydrocarbon species and soot particles. The subsequent combustion of soot rich, preheated fuel and preheated oxidant in the furnace atmosphere produce a very luminous and low emission flame. The configuration of burner nozzle(s) is such that it promotes thermal cracking of fuel, delayed mixing, enhanced flame radiation and lower emissions of NOx and process particulate. Preferred materials for the "concentric" oxidant and fuel nozzle (s) are nickel-chromium-iron alloys, or ceramic coated temperature resistant stainless steels. The burner is able to switch from hot oxidant and fuel service to ambient oxidant and fuel service very easily.

Having described the present invention, it will be readily apparent to the artisan that many changes and modifications may be made to the above-described embodiments without departing from the spirit and the scope of the present invention.

What is claimed is:

1. A burner apparatus comprising:
 a) a conduit conveying a preheated oxidant flow and having outlet and inlet ends;
 b) a conduit conveying a preheated fuel flow and having outlet and inlet ends, the conduit conveying the preheated fuel flow being substantially parallel to the conduit conveying the preheated oxidant flow, the conduit conveying the preheated oxidant flow being positioned substantially vertically above the conduit conveying the preheated fuel flow;
 c) the conduit conveying the preheated oxidant flow being positioned within a respective elongate cavity in a refractory burner block, the conduit conveying the preheated fuel flow being positioned within a respective elongate cavity in the refractory burner block, each of said conduits positioned in their respective cavity such that a substantially annular region is present between an outer surface of each said conduit and respective cavity; and
 d) each conduit inlet end extending through a respective plenum and receiving an ambient temperature fluid flow, the plenums adapted to pass said ambient temperature fluid flow into the respective annular regions, wherein the flows of preheated fuel and preheated oxidant through the respective conduits occur simultaneously with the flow of the ambient temperature fluids through the respective cavities.

2. Burner apparatus in accordance with claim 1 wherein the outlet end of each cavity is coterminous with a hot face of the refractory burner block.

3. Burner apparatus in accordance with claim 1 wherein a plurality of conduits conveying the preheated oxidant flow are positioned in respective cavities in the refractory burner block, and plurality of conduits conveying the preheated fuel flow are positioned in respective cavities in said refractory burner block.

4. Burner apparatus in accordance with claim 1 wherein the outlet end of the conduit conveying the preheated oxidant flow is connected to an outlet of a preheated oxidant nozzle assembly, the preheated oxidant nozzle assembly comprising an expansion joint which connects an inlet of the preheated oxidant nozzle assembly to a preheated oxidant nozzle downstream of the expansion joint, the preheated oxidant nozzle having a preheated oxidant nozzle outlet and an axis.

5. Burner apparatus in accordance with claim 4 wherein the preheated oxidant nozzle outlet is recessed from the outlet end of the cavity in which is positioned the conduit conveying the preheated oxidant flow.

6. Burner apparatus in accordance with claim 4 wherein the outlet end of the conduit conveying the preheated fuel flow is connected to an inlet of a preheated fuel nozzle, the preheated fuel nozzle having a preheated fuel nozzle outlet and an axis.

7. Burner apparatus in accordance with claim 6 wherein the preheated oxidant nozzle axis is angled toward the fuel nozzle axis.

8. Burner apparatus in accordance with claim 7 wherein the preheated fuel nozzle outlet is recessed from the outlet end of the cavity in which is positioned the conduit conveying the preheated fuel flow.

9. Burner apparatus in accordance with claim 1 wherein the cavity in which is positioned the conduit conveying the preheated fuel flow or the cavity in which is positioned the conduit conveying the preheated oxidant flow comprises an expansion section, the expansion section connecting a first ambient fluid cavity positioned upstream of the expansion section and a second ambient fluid cavity positioned downstream of the expansion section and having an internal diameter greater that an internal diameter of the first ambient fluid cavity, the expansion section having an inlet and an outlet, the inlet of the expansion section having a diameter less than the outlet of the expansion section.

10. Burner apparatus in accordance with claim 9 wherein the conduit conveying the preheated fuel flow terminates with a nozzle, the nozzle having a nozzle outlet that is positioned coterminous with the inlet to the expansion section of its respective fluid cavity.

11. Burner apparatus in accordance with claim 1 wherein the conduit conveying the preheated fuel flow extends through and is positioned within an intermediate conduit, the intermediate conduit positioned between the conduit conveying the preheated fuel flow and its respective cavity, the intermediate conduit having an outlet and an inlet end, the intermediate conduit inlet end connected to one of said plenums receiving ambient fuel, the intermediate conduit and said cavity creating an annular region for introduction of ambient oxidant, the intermediate conduit and the conduit conveying the preheated fuel flow creating an annular region for conveying ambient fuel.

12. Burner apparatus in accordance with claim 1 wherein further including a fluid connection which connects the cavity in which the conduit conveying the preheated oxidant flow is positioned with the cavity in which the conduit conveying the preheated fuel flow is positioned.

13. Burner apparatus in accordance with claim 12 wherein said fluid connection has a fluid connection inlet and a fluid connection outlet, the fluid connection inlet connected with the cavity in which the conduit conveying the preheated oxidant flow is positioned at a position upstream of a point where the fluid connection outlet is connected to the cavity in which is positioned the conduit conveying the preheated fuel flow.

14. Burner apparatus in accordance with claim 13 wherein the refractory burner block is comprised of an upper refractory burner block and a lower refractory burner block, the upper and lower refractory blocks contacted in a plane which is generally parallel with an axis of the conduit conveying the preheated fuel flow, the lower refractory burner block having positioned therein the cavity in which is positioned the conduit conveying the preheated fuel flow, and the upper refractory burner block having positioned therein the cavity in which is positioned the conduit conveying the preheated oxidant flow.

15. Burner apparatus in accordance with claim 1 wherein the conduit conveying the preheated oxidant flow is an alloy selected from the group consisting of:
  a) an alloy comprising (by weight) Ni>72%, Cr 14–17%, Fe 6–10%, C<0.15%, Si<0.5%, and Cu<0.5%;
  b) an alloy comprising (by weight) 18–21% Ni; 22–25% Cr; 50–52% Fe; C<0.1%; 1.5% Mn; Si<0.1%; and 3% Mo;
  c) an alloy comprising (by weight) 30–35% Ni; 19–23% Cr; Fe>39.5%; C<0.1%; Mn<1.5%; Si<1%; 0.15–0.6% Al; 0.15–0.6% Ti; and
  d) an alloy comprising (by weight) 20% Cr; 5.5% Al; 0.5% Ti; 0.5% $Y_2O_3$; balance Fe.

16. Burner apparatus in accordance with claim 15 wherein the alloys have a ceramic protective layer or ceramic coating, the ceramic selected from the group consisting of chromia, aluminum, and silica.

17. Burner apparatus in accordance with claim 15 wherein the alloys have been diffusion or spray coated.

18. Burner apparatus in accordance with claim 17 wherein the diffusion coating leads to surface enrichment of Si typically between about 0.5 and 5%, and to surface enrichment of Al typically between about 20% to about 35%.

19. Burner apparatus in accordance with claim 6, wherein;
  a) each of the preheated oxidant nozzle outlet and the preheated fuel nozzle outlet are spaced from the hot face of the refractory burner block by a same distance.

20. Burner apparatus in accordance with claim 6, wherein:
  a) the preheated oxidant nozzle outlet is spaced from the hot face of the refractory burner block by a distance $L_o$;
  b) the preheated fuel nozzle outlet is spaced from the hot face of the refractory burner block by a distance $L_f$, and
  c) $L_o$ is not equal to $L_f$.

21. Burner apparatus is accordance with claim 12, wherein:
  a) the preheated fuel flow flows along a vector $V_f$,
  b) the preheated oxidant flow flows along a vector $V_o$; and
  c) the fluid connection diverts at least a portion of the preheated oxidant flow along a vector $V_c$ that does not lie within a plane defined by vectors $V_f$ and $V_o$.

22. Burner apparatus in accordance with claim 12, wherein:
  a) the fluid connection imparts a swirling motion to the preheated oxidant flow flowing therethrough.

23. A burner apparatus comprising:
  b) a plurality of conduits conveying a flow of preheated oxidant each having outlet and inlet ends and being aligned in a first plane;
  c) a plurality of conduits conveying a flow of preheated fuel each having outlet and inlet ends being aligned in a second plane, the first plane being parallel to the second plane;

d) each of the conduits is positioned within a respective one of a plurality of elongate cavities in a refractory burner block, each of said conduits positioned in the respective cavity such that a substantially annular region is defined between an outer surface of each said conduit and the respective cavity; and e) each conduit inlet and extending through a respective plenum receiving a flow of ambient temperature fluid, the plenums passing said ambient temperature fluid into the respective annular regions, wherein the flows of preheated fuel and preheated oxidant through the respective conduits occur simultaneously with the flow of the ambient temperature fluids through the respective cavities.

24. A burner apparatus, comprising:

f) a burner assembly comprising,
  i) a first conduit having an inlet and an outlet,
  ii) a second conduit conveying a flow of preheated oxidant extending at least partly through said first conduit such that a first annular region is defined between an inside surface of said first conduit and an outside surface of said second conduit, said first annular region conveying a flow of ambient oxidant,
  iii) a third conduit having an inlet and an outlet,
  iv) a fourth conduit conveying a flow of preheated fuel extending at least partly through said third conduit such that a second annular region is defined between an inside surface of said third conduit and an outside surface of said fourth conduit, said second annular region conveying a flow of ambient fuel, and
  v) a fifth conduit in fluid communication with said first and second annular regions and conveying at least a potion of said flow of ambient oxidant from said first annular region to said second annular region; and b) a refractory burner block having a hot face and a cold face, said refractory burner block having a hollow volume extending from said cold face to a position within said refractory burner block intermediate to said cold face and said hot face, said intermediate position defined by a wall of a substantially solid portion of said burner block, said substantially solid portion having a first cavity adapted to receive said flow of preheated oxidant from said second conduit, and a second cavity adapted to receive said flow of preheated fuel from said fourth conduit, wherein said flows of preheated oxidant, ambient oxidant, preheated fuel and ambient fuel occur simultaneously during operation of said burner apparatus.

25. Burner apparatus in accordance with claim 24 wherein said conduits conveying the preheated oxidant and preheated fuel flows are both metallic and both removable from the metallic fluid flow assembly.

* * * * *